M. H. Nichols.
Securing Covers to Butter Jars.
Nº 92,343.      Patented Jul. 6, 1869.

Witnesses
A. W. Almqvist
Hinchman

Inventor
M. H. Nichols
per Mmm &c.

United States Patent Office.

MOSES H. NICHOLS, OF HANCOCK, NEW YORK.

Letters Patent No. 92,343, dated July 6, 1869.

IMPROVEMENT IN DEVICES FOR SECURING COVERS TO JARS FOR TRANSPORTATION.

The Schedule referred to in these Letters Patent and making part of the same.

*To all whom it may concern:*

Be it known that I, MOSES H. NICHOLS, of Hancock, in the county of Delaware, and State of New York, have invented a new and useful Improvement in Securing Butter-Jars; and I do hereby declare that the following is a full, clear, and exact description thereof, which will enable others skilled in the art to make and use the same, reference being had to the accompanying drawing, forming part of this specification.

This invention relates to a new and useful improvement in means for securing and protecting jars or pots of butter, lard, preserved meats, fruits, desiccated vegetables, and other articles, which are placed in glass or stone jars, or pots, for preservation from the air and for transportation; and consists in the employment of two or more right and left-handed screw-rods for drawing together plates of metal, or top and bottom pieces of wood, between which the jar or pot is confined, as hereinafter more fully described.

In the accompanying sheet of drawing—

Similar letters of reference indicate corresponding parts.

Figure 1:
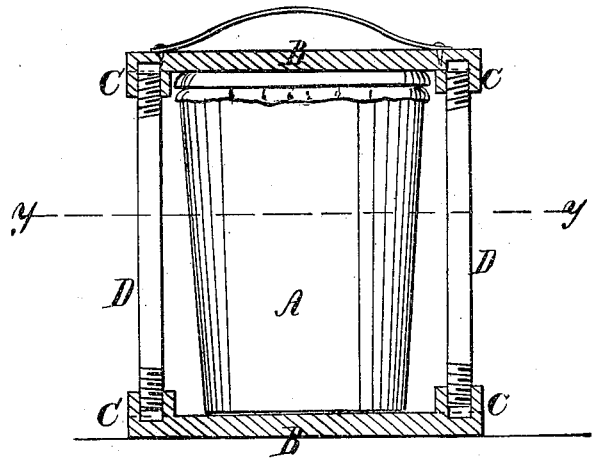
Figure 1 represents a vertical section through the line $x$–$x$ of fig. 2, showing the two wooden pieces or squares, connected together by the screw-rods, between which the jar is secured.
Figure 2:
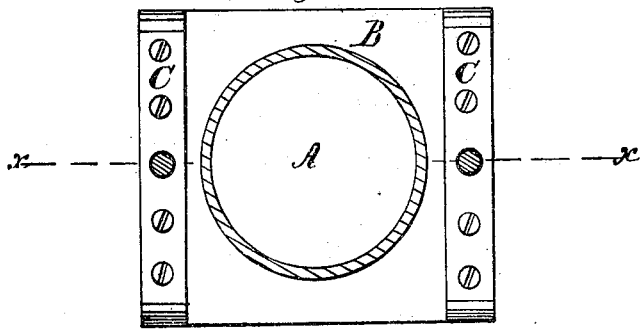
Figure 2 is a horizontal section of fig. 1, through the line $y$–$y$.

A represents the jar, which is made of glass or of stone, or of other suitable material for properly preserving butter, lard, and other similar articles.

For butter, the jar should be made, as represented in the drawing, tapering from the bottom to the top, so that, by inverting it, the contents will leave the jar in a compact form, corresponding with the inside of the jar.

B B represent pieces of wood or board, of suitable thickness and size for enclosing the jar, which pieces may have cross-strips C fastened to them, crosswise of the grain, to prevent the warping of the boards, and to give a good hold for the screws.

D D represent rods, with each a right-hand screw-thread on one end, and a left-hand thread on the other end, with corresponding screw-threads cut in the strips C, and also in the pieces or boards B, if desired.

The butter being properly packed, and the top of the jar being protected in any suitable manner, the jar is placed between the top and bottom pieces B B, and the screw-rods are revolved, one of each of their ends having a right, and the other end a left-hand screw.

It will be seen that the effect will be to draw the top and bottom pieces together as tightly as may be required.

Any elastic packing or material on the top of the jar will be compressed, so that the air will be effectually excluded, while the jars may, when thus protected, be kept for any desired length of time, or transported to market, without danger of being broken by contact with each other.

For large jars, three or four of the screw-rods may be used.

In case four are used, one of them may be shorter than the rest, so as to be more readily detached for removing the jar.

Having thus described my invention,

What I claim as new, and desire to secure by Letters Patent, is—

The combination, with the jar A, of the right and left-hand screw-rods D D, and the top and bottom pieces B B, as herein described, for the purpose specified.

MOSES H. NICHOLS.

Witnesses:
C. ROOD, Jr.,
CHS. STODDARD.